Dec. 18, 1928.
G. T. THURNEYSSEN
1,695,830
JOINT AND CONNECTION
Filed Oct. 25, 1924
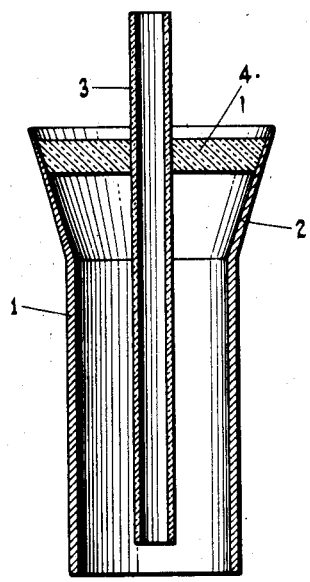
INVENTOR
GUY THEODORE THURNEYSSEN
BY
ATTORNEY Patented Dec. 18, 1928.

1,695,830

UNITED STATES PATENT OFFICE.

GUY THÉODORE THURNEYSSEN, OF PARIS, FRANCE.

JOINT AND CONNECTION.

Application filed October 25, 1924, Serial No. 745,731, and in France October 27, 1923.

This invention relates to joints between materials having different coefficients of expansion and particularly to joints between metallic and glass members. The invention also relates to methods of making such joints.

One of the principal objects of the invention is the provision of a joint or connection between materials possessing different coefficients of expansion having: (1) reliability; (2) inability of damage to the various materials on changes of temperature; (3) ruggedness; and (4) air tightness. Another principal object of the invention is the provision of an inexpensive method of making such joints or connections.

Other objects and advantages of the invention will be apparent from the following description of a preferred modification of the invention shown in the single figure of the drawing.

A metallic tube 1 terminating in a slightly widening hollow conical portion 2, the walls of which are comparatively thin, is provided. A glass tube or bar 3 of smaller diameter than the internal diameter of the metallic tube has an annular disc of glass 4 secured to it by welding or some equivalent method. The external diameter of the annular glass disc is of substantially the same diameter as the internal diameter of a part of the conical portion of the metallic tube.

The interior walls of the conical portion are enameled by the successive application in a heated state of a mordant or caustic and immediately thereafter by an enamel posessing an appropriate coefficient of expansion, substantially equal to the coefficient of expansion of the metallic member. The glass tube or bar togther with the annular glass disc is now inserted in the metallic tubular member in such a way that the annular glass disc engages with difficulty the part of larger diameter of the conical portion when the entire assembly possesses a comparatively low temperature.

The glass tube or bar owing to its comparatively small diameter passes freely through even the most constricted part of the conical portion. The conical portion is now heated and pressure is applied to unite the conical portion to the annular glass disc. The fusible glass comprising the annular disc is, of course, softened during the application of heat, resulting in the glass tube and disc penetrating still further into the metallic tube. The softening of the fusible glass of the annular glass disc effects an intimate adherence and connection with the enamel. This results in a hermetical joint between the metal and glass. In the case of joints of small diameter, thorough heating of the entire assembly is advisable but not indispensable.

When cooling, the conical portion exerts a pressure upon the annular glass disc owing to the fact that its coefficient of expansion is greater than that of the glass. The annular glass disc will withstand this pressure, and the metallic conical portion, in view of its elastic properties, will contract. It is to be noted that the fusible glass disc contributes also to the production of an increased thickness and thereby to an increase in the strength of the glass tube to withstand the compression produced by the metallic conical portion.

While I have shown and described a preferred embodiment of my invention I do not limit myself to the same but may employ such other modifications as come within the spirit and scope of the invention.

I claim:

1. In combination, a hollow metallic member having an enlarged portion with comparatively thin walls, a glass member of smaller external diameter than the internal diameter of said metallic member, an annular member of glass secured to said glass member and means for hermetically securing said annular glass member in the enlarged portion of said metallic member.

2. The method of producing an hermetic seal between a metallic member and a glass cover portion, which consists in forming said member with a flared portion, coating said flared portion with a fusible enamel, and fusing said cover plate to said enamelled portion by the application of heat and pressure.

3. In a hermetically sealed vessel, a metallic portion, a fusible enamel coating on a portion thereof, and a glass cover plate fused to said enamel coating.

4. In a hermetically sealed vessel, a metallic member having a conical portion, an enamel coating applied to said conical portion and a cover plate fused to said enamel coating.

GUY THÉODORE THURNEYSSEN.